(12) United States Patent
Engelhard et al.

(10) Patent No.: US 6,449,806 B1
(45) Date of Patent: Sep. 17, 2002

(54) HEAD STRAP FOR HEADPHONES OR HEARING PROTECTOR

(76) Inventors: Jörg Engelhard, Hoffnungsthaler Strasse 25, 51503 Forsbach (DE); Manfred Hargarter, Pappelweg 9, 66687 Wadern (DE)

( * ) Notice: Subject to any disclaimer, the term of this patent is extended or adjusted under 35 U.S.C. 154(b) by 0 days.

(21) Appl. No.: 09/532,440

(22) Filed: Mar. 23, 2000

(30) Foreign Application Priority Data

Mar. 24, 1999 (DE) .................................... 299 05 370 U

(51) Int. Cl.[7] ............................. A42B 3/16; A61F 11/14
(52) U.S. Cl. ........................ 24/3.1; 2/209; 381/72; 381/376
(58) Field of Search .................... 24/3.1, 3.11, 3.12; 2/209, 410, 448, 431, 449, DIG. 11, 417, 423; 403/59, 104, 80; 181/129; 128/804; D14/205; 381/381, 72, 376

(56) References Cited

U.S. PATENT DOCUMENTS

| | | | | |
|---|---|---|---|---|
| 2,993,962 A | * | 7/1961 | Hothem | D14/206 X |
| 3,505,684 A | * | 4/1970 | Hutchinson et al. | 2/209 |
| 4,209,264 A | * | 6/1980 | Hellberg | 2/209 X |

* cited by examiner

*Primary Examiner*—Robert J. Sandy
(74) *Attorney, Agent, or Firm*—Diller, Ramik & Wight

(57) ABSTRACT

A head strap for a set of headphones or hearing protector s with two ear members comprises two almost parallel wire arcs (18, 19) for connecting the two ear members. The two wire arcs (18, 19) are held together by a connecting member (20), wherein the connecting member (20) is a rigid plate. The rigid plate (20) comprises two recesses (22) extending in the longitudinal direction over the entire length of the plate, a wire arc section (18, 19) being fixed in the recesses, respectively.

23 Claims, 2 Drawing Sheets

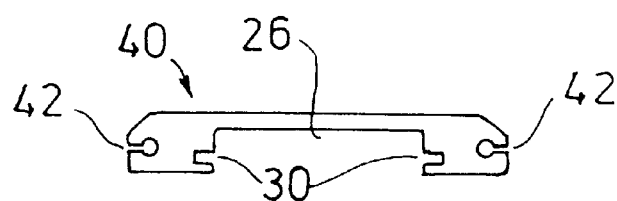
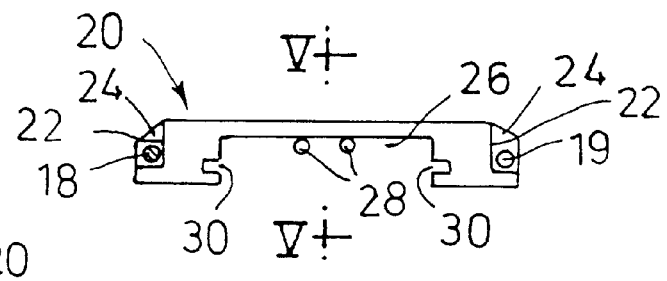
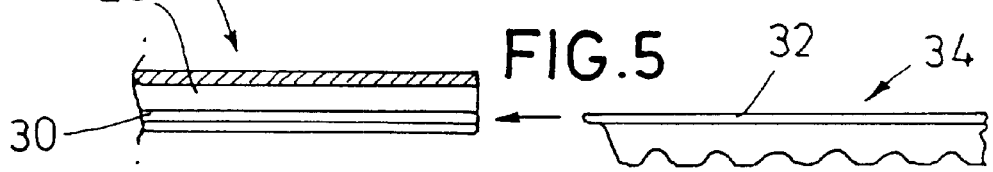
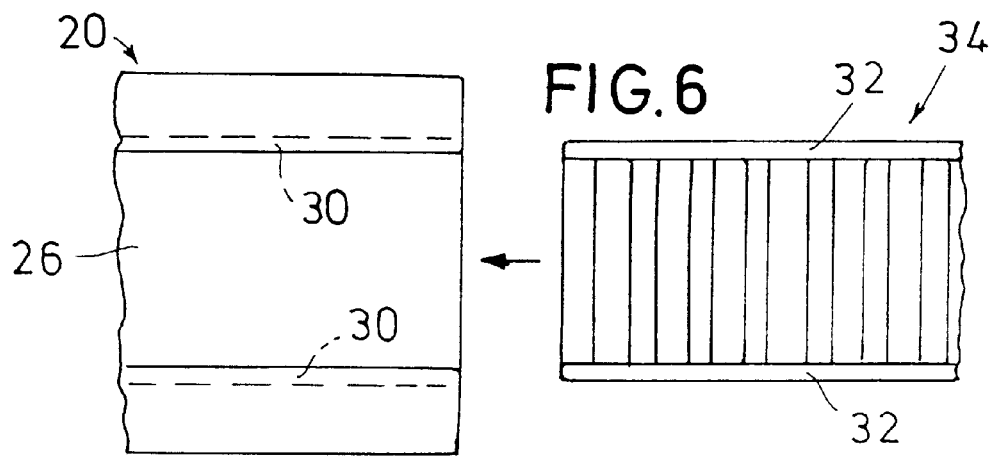
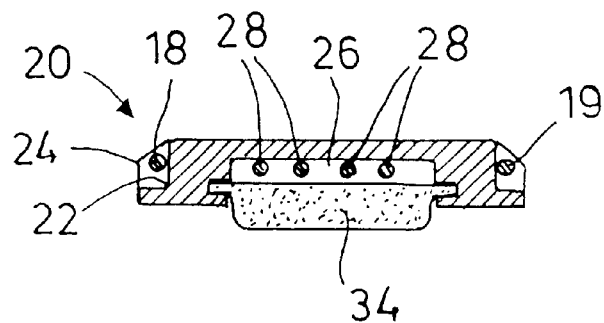

HEAD STRAP FOR HEADPHONES OR HEARING PROTECTOR

BACKGROUND OF THE INVENTION

The present invention relates to a head strap for headphones or hearing protectors with two ear members connected by two almost parallel wire arcs that are held together by a connecting member.

The head strap of a set of headphones or hearing protectors has to hold both ear members together such that, when the headphones are positioned on the head of a user, the head strap applies a certain minimum spring tension by which the ear members are pressed towards the ears. Head straps of plastic material do not provide constant spring forces—especially when humidity is involved. In particular with closed headphones and hearing protectors, however, a constant contact pressure is imperative for a good functionality. Head straps have proven suited, in particular with closed headphones and hearing protectors, which are formed by two generally parallel wire arcs for connecting both ear members. The two wire arcs are held together by a connecting member designed as a head cushion. The head cushion is a soft pad into which sections of the two wire arcs are welded. Since both wire arcs can move relative to each other and within the head cushion, the head strap only has limited stability and rigidity. Thus, the flexible connecting member is worn down fast and possibly torn. The flexible connecting member is preferably made by HF welding two plastic films between which the wire arcs are located.

It is the object of the present invention to provide a more stable head strap for headphones or hearing protectors.

SUMMARY OF THE INVENTION

The connecting member of the present invention is designed as a rigid plate comprising two recesses extending longitudinally over the entire length of the plate, a respective wire arc section being fixed therein. Thus, the plate forms a rigid bridge between the two wire arcs so that the relative movability of the two wire arcs is reduced to a minimum. By reducing the movability and selecting a more robust material for the connecting member, the durability of the head strap is improved considerably. The wire arc section in the recess can no longer be overstretched so that, all in all, the spring force and thus the contact pressure are maintained. The rigid plate is a single piece member, for example, and is easily assembled with the wire arcs to form a head strap.

Preferably, the recesses are provided at the longitudinal edges of the plate. Thus, almost the entire width of the plate lies between the two wire arcs.

According to a preferred embodiment, the recess is formed step-like so that the wire arcs may readily be set into the recess. Alternatively, the recess may also be a gap into which the wire arc section may be clamped. In this manner, a firm connection is created already when assembling the wire arcs and the plate. Preferably, the wire arc sections are each cast in plastic within the recesses. After the wire arcs have been placed into the recess of the pre-fabricated rigid plate, the opening of the recess is filled with plastic material. This may also be a soft elastic plastic material, for example, in order to guarantee a minimum movability of the wire arc section in the recess. By casting the wire arc sections in plastic in the recesses, a permanent and firm connection between the wire arc and the rigid plate is obtained that guarantees a long serviceable life of the head strap.

According to a preferred embodiment, at least two rigid plates are provided for holding the wire arcs together. When several plates are used, a certain flexibility of the wire arcs remains between the plates. In this manner, a great rigidity and a high stability of the head strap are achieved without degrading of the resilient and tensioning properties of the wire arcs too much.

Preferably, a joint of elastic plastic material is permanently molded between two adjacent plates. One may also provide a bellows or the like as a joint between two adjacent plates. Hereby, it is primarily guaranteed that the space between two plates is filled or closed so that the space between two plates is mostly free of edges gaps and steps. Thus, deposits in this area are avoided and the head strap is easier to clean. The joint may also be a film hinge.

Preferably, the plate has a longitudinally extending wire channel. The wire channel may be provided in the center between the two recesses. In particular with head straps for headphones, the cable channel may accommodate cables for transmitting audio signals or control signals.

According to another preferred embodiment, the plate has longitudinally extending opposite grooves into which lateral webs of a padding element may be inserted. In this manner, the padding element is easy to assemble and also replaceable.

BRIEF DESCRIPTION OF THE DRAWINGS

The following is a detailed description of three embodiments of the present invention with reference to the drawings.

In the figures:

FIG. 3 shows a second embodiment of a connecting member plate, FIG. 4 is a front end view of the plate of FIG. 1, FIG. 5 is a longitudinal section along line V—V in FIG. 4, also illustrating a padding element, FIG. 6 is a top plan view on the connecting member plate and the padding element of FIG. 5, and FIG. 7 is a cross-sectional view of the connecting member plate of FIGS. 1–3 with a padding element.

DETAILED DESCRIPTION OF PREFERRED EMBODIMENTS

Figure 1:
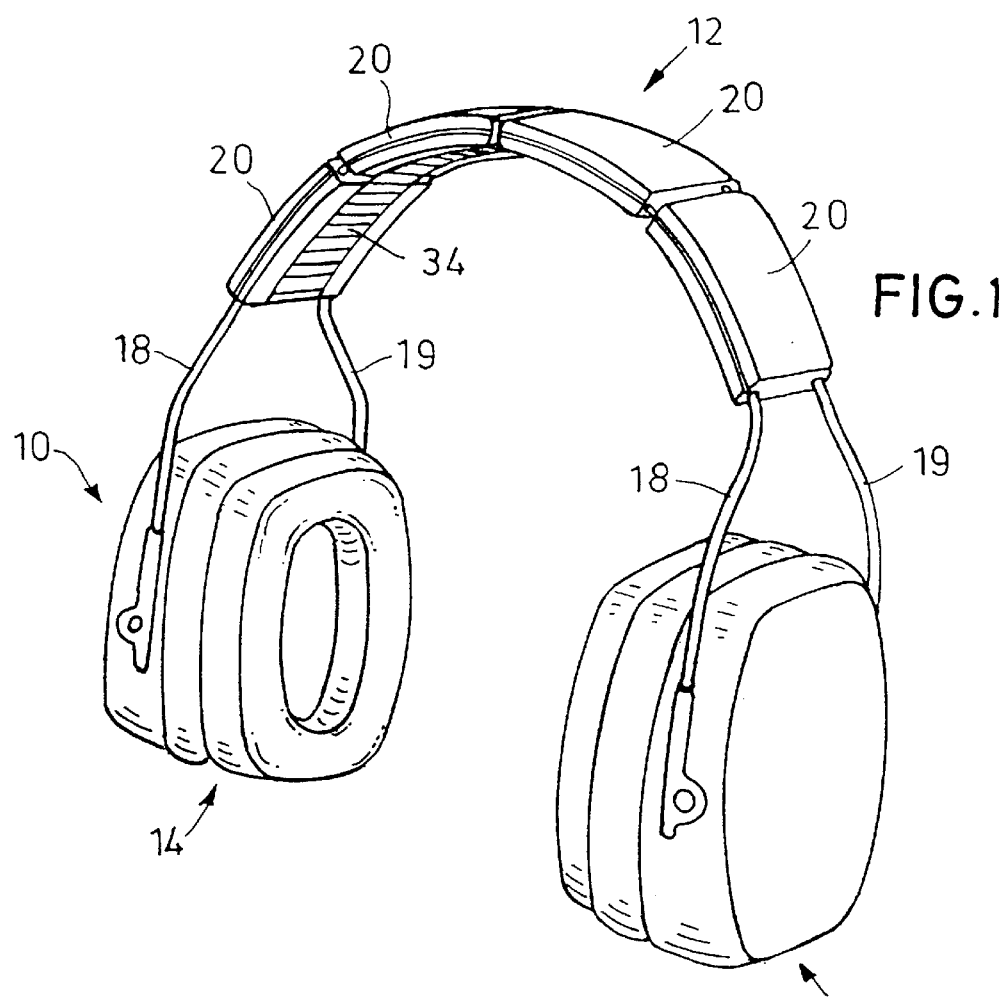
FIG. 1 illustrates a hearing protector with two ear members interconnected by a head strap comprising four rigid plates.

FIG. 1 illustrates a hearing protector 10 comprising a head strap 12 holding two ear members 14, 15 constructed as shell-like housings. The hearing protector 10 serves as an acoustic shielding for the ears in noisy areas.

Figure 2:
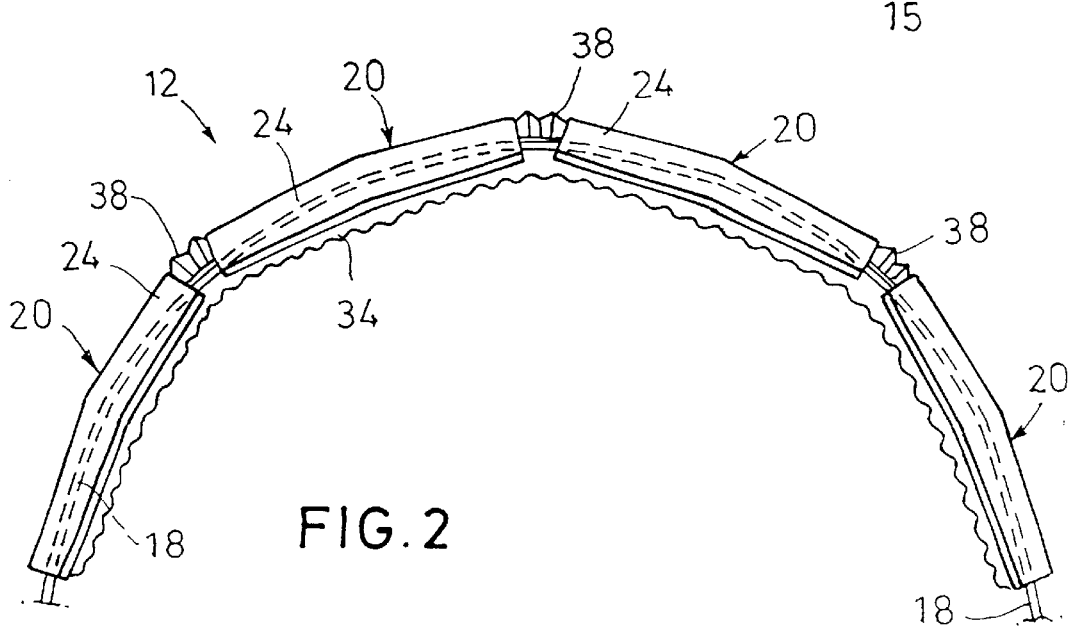
FIG. 2 is a side elevational view of the four head strap plates of FIG. 1.

The head strap 12 comprises two almost parallel metal wire arcs 18, 19, at the ends of which the two ear member housings 14, 15 are fastened for pivotal movement. The two wire arcs 18, 19 are held together by four identical connecting members 20 in the form of rigid plastic plates. Each connecting member 20 is slightly bent in the longitudinal direction or kinked under a kinking angle of 10°, thereby being adapted to the arcuate shape of the wire arcs 18, 19, as illustrated in FIG. 2.

Each connecting plate member 20 has its two longitudinal sides provided with a respective longitudinally extending step-like recess 22, into which a wire arc section is placed, respectively, and then encapsulated with a soft elastic plastic mass 24. As visible in FIGS. 4 and 7, the connecting member 20 further comprises a longitudinally extending continuous open cable channel 26 in which cables 28 for transmitting microphone, speaker or control signals may be accommodated.

Each connecting plate element 20 comprises two longitudinally extending opposite continuous grooves 30 into which two lateral webs 32 of a flexible and yielding plastic padding element 34 may be inserted, as is particularly well illustrated in FIGS. 5 and 6. The padding element 34 is about four times the length of a connecting member 20 so that a single padding element 34 is needed for one head strap 12. The cushion-like padding element 23 is readily replaceable.

The connecting members 20 are interconnected by bellows-like joints 38.

FIG. 3 illustrates a second embodiment of a connecting member 40 with gap-like recesses 42 open to the sides, into which both wire arcs 18, 19 may be inserted in locked manner.

The length of the plate 20 is about 45 mm, the width is about 45 mm and its material thickness is about 6.5 mm. The cable channel has a width of about 32 mm, the depth of the recesses 22, 42 is about 4.0 mm. The overall length of the four adjoining plates 20 is about 201 mm.

The material used for the plates is polypropylene. Other suited materials are polyethylene, ABS or other plastics. To fill the recesses 22, 42 in order to fix the wire arcs, an elastomer TPE is used.

What is claimed is:

1. A head strap for a set of headphones or hearing protectors with two ear members comprising two substantially parallel wire arcs for connecting the two ear members, the two wire arcs being held together by a connecting member, the connecting member being a substantially rigid plate, the rigid plate including two recesses extending in a longitudinal direction over substantially the entire length of the plate, a wire arc section of the wire arcs being fixed in the recesses, and one of said recesses being located at each of the longitudinal edges of the plate.

2. The head strap as defined in claim 1 wherein each recess is step-like in shape.

3. The head strap as defined in claim 1 wherein each recess is a gap into which the wire arc section may be clamped.

4. The head strap as defined in claim 1 wherein the wire arc sections in the recesses are each encapsulated with plastic material.

5. The head strap as defined in claim 1 wherein at least two substantially rigid plates are provided for holding the wire arcs together.

6. The head strap as defined in claim 5 wherein a joint of elastic plastic material permanently molded to the plates is provided between two adjacent plates.

7. The head strap as defined in claim 1 wherein the plate has a wire channel extending longitudinally substantially along a center line between the recesses.

8. The head strap as defined in claim 1 wherein the plate has longitudinally extending opposite grooves, a padding element having opposite lateral webs, and said lateral webs being inserted into said longitudinally extending opposite grooves.

9. The head strap as defined in claim 8 wherein the length of the padding element is at least twice the length of a plate so that the padding element covers a plurality of plates.

10. The head strap as defined in claim 1 wherein the plate is formed integrally from plastic material.

11. A head strap for a set of headphones or hearing protectors with two ear members comprising two substantially parallel wire arcs for connecting the two ear members, the two wire arcs being held together by a connecting member, the connecting member being a substantially rigid plate, the rigid plate including two recesses extending in a longitudinal direction over substantially the entire length of the plate, a wire arc section of the wire arcs being fixed in the recesses, and each recess being step-like in shape.

12. The head strap as defined in claim 11 wherein each recess is a gap into which the wire arc section may be clamped.

13. The head strap as defined in claim 11 wherein at least two substantially rigid plates are provided for holding the wire arcs together.

14. The head strap as defined in claim 11 wherein the plate has a wire channel extending longitudinally substantially along a center line between the recesses.

15. The head strap as defined in claim 11 wherein the plate has longitudinally extending opposite grooves, a padding element having opposite lateral webs, and said lateral webs being inserted into said longitudinally extending opposite grooves.

16. The head strap as defined in claim 11 wherein the plate is formed integrally from plastic material.

17. A head strap for a set of headphones or hearing protectors with two ear members comprising two substantially parallel wire arcs for connecting the two ear members, the two wire arcs being held together by a connecting member, the connecting member being a substantially rigid plate, the rigid plate including two recesses extending in a longitudinal direction over substantially the entire length of the plate, a wire arc section of the wire arcs being fixed in the recesses, and said wire arc sections in the recesses are each encapsulated with plastic material.

18. The head strap as defined in claim 17 wherein each recess is step-like in shape.

19. The head strap as defined in claim 17 wherein each recess is a gap into which the wire arc section may be clamped.

20. The head strap as defined in claim 17 wherein at least two substantially rigid plates are provided for holding the wire arcs together.

21. The head strap as defined in claim 17 wherein the plate is formed integrally from plastic material.

22. The head strap as defined in claim 17 wherein the plate has a wire channel extending longitudinally substantially along a center line between the recesses.

23. The head strap as defined in claim 17 wherein the plate has longitudinally extending opposite grooves, a padding element having opposite lateral webs, and said lateral webs being inserted into said longitudinally extending opposite grooves.

* * * * *